United States Patent [19]

Maeda et al.

[11] Patent Number: 5,115,048

[45] Date of Patent: May 19, 1992

[54] COATING COMPOSITION FOR MOLD COAT OF MOLDED POLYURETHANE RESIN

[75] Inventors: Mitsuyo Maeda, Sagamihara; Toshio Tanabe; Shimata Tanabe, both of Osaka; Takashi Toyama, Ebina; Masashi Ono, Chigasaki, all of Japan

[73] Assignees: Nissan Motor Co., Ltd., Yokohama; Tanabe Chemical Industrial Inc., Osaka, both of Japan

[21] Appl. No.: 326,761

[22] Filed: Mar. 21, 1989

[30] Foreign Application Priority Data

Mar. 22, 1988 [JP] Japan .................. 63-68795

[51] Int. Cl.$^5$ ........................... C08F 299/06
[52] U.S. Cl. ........................... 525/457
[58] Field of Search ........................... 525/457

[56] References Cited

U.S. PATENT DOCUMENTS

| | | | |
|---|---|---|---|
| 4,419,407 | 12/1983 | Piccirilli et al. | 525/443 |
| 4,425,468 | 1/1984 | Makhlouf et al. | 525/459 |
| 4,481,345 | 11/1984 | Nachtkamp et al. | 528/61 |
| 4,495,229 | 1/1985 | Wolf et al. | 528/61 |
| 4,496,707 | 1/1985 | Ligget | 528/61 |
| 4,543,405 | 9/1985 | Ambrose et al. | 528/78 |
| 4,579,528 | 4/1986 | Kay et al. | 528/62 |
| 4,663,415 | 5/1987 | Grögler et al. | 528/62 |

*Primary Examiner*—John Kight, III
*Assistant Examiner*—P. Hampton-Hightower
*Attorney, Agent, or Firm*—Foley & Lardner

[57] ABSTRACT

A coating composition for use in a mold coat coating process wherein the coating composition is previously coated on the molding surface of a mold for polyurethane resin, prior to molding of the polyurethane resin in which the coating composition is transferred onto the surface of the molded polyurethane resin. The coating composition is comprised of a principal component including a resin constituent whose principal ingredient is addition polymer of isophorone diisocyanate and polycarbonate polyol in a content ranging from 8 to 25% by weight of the principal component, and a hardener component including a resin constituent whose principal ingredient is addition polymer of hexamethylene diisocyanate and isophorone diisocyanate in a content ranging from 5 to 100% by weight of the hardener component, thereby improving pot life and weatherability of coating film of the coating composition while contributing shortening of so-called open time in a molding cycle.

15 Claims, No Drawings

COATING COMPOSITION FOR MOLD COAT OF MOLDED POLYURETHANE RESIN

BACKGROUND OF THE INVENTION

1. Field of the Invention

This invention relates to a coating composition for mold coat of a molded polyurethane resin, and more particularly to such a coating composition which has long pot life and high drying ability while having high weatherability.

2. Description of Prior Art

Hitherto so-called mold coat coating process has been proposed and put into practical use in molding polyurethane resin, in which a coating composition is coated on the inner or molding surface of a mold for polyurethane resin, prior to molding of polyurethane resin; and thereafter the coated coating composition is transferred onto the outer surface of the molded polyurethane resin during molding of the polyurethane resin. There are two types of coating compositions for the mold coat process, i.e., a single liquid type one and a two liquid type one. These types of the mold coat coating compositions will be listed hereinafter.

The single liquid type coating composition (polyurethane lacquer):

- a resin constituent: polyurethane compound as addition polymer of glycols (adipate, hexane adipate and the like) and diisocyanates (no yellowing type isophorone diisocyanate, xylene diisocyanate and the like);
- a solvent: a mixture of cyclohexanone, methylethyl ketone, xylene, toluene, isopropanol, ethyl acetate, butyl acetate and the like;
- a pigment: carbon black (or organic or inorganic colouring pigment to be used for automotive vehicle body in case of other than black):
- a dispersant: high molecular weight polycarboxylic acid salt, polyaminoamide phosphate, or alkylamine salt of polycarboxylic acid; and
- a light resisting agent: a light stabilizer of benzophenone, benzotriazole or hindered amine.

The two liquid type coating composition:
a principal component:
- a resin component (a): polyester polyol (having a molecular weight of 800 to 3,000, hydroxyl value of 12 to 150 and an acid value of not more than 4) which is a polymer of polybasic acid (adipic acid, dicarboxylic acid such as phthalic acid) and polyol of polyhydric alcohol (polyol having OH group at its chain end, such as ethylene glycol, trimethylol propane and the like);
- a resin constituent (b): a mixture of polyester polyol (or the resin constituent (a)) and acryl polyol whose principal ingredient is alkyl acylate containing stylene or alkylmethacrylate;
- a resin constituent (c): a mixture of the above-mentioned resin component (b) and a copolymer of vinyl chloride and vinyl acetate, or of the above-mentioned resin component (b) and cellulose resin such as cellulose acetate butyrate; and/or
- a resin constituent (d): acryl polyol of hydroxyacryl copolymer (having a molecular weight of 3,000 to 10,000, an acid value of 2 to 9 and a hydroxy value of 5 to 30) of acrylate containing hydroxy such as hydroxyalkyl methacrylate and hydroxyalkyl acrylate, and acrylic esters (MMA, butyl methacrylate and the like);
- solvent: a mixture of ester solvent such as ethyl acetate, butyl acetate or the like, ketone solvent such as methylisobutyl ketone, methylethyl ketone or the like, and aromatic hydrocarbon such as toluene, xylene or the like, and glycol ether such as cellosolve acetate, butyl cellosolve acetate or the like;
- additives: a surface improving agent of polysiloxane copolymer such as silicone oil or the like; a pigment dispersant of alkylamine salt of polycarboxylic acid or polycarboxylic acid salt; and optionally a light stabilizer of benzophenone, benzotriazole or hindered amine;
- pigment: inorganic pigment of carbon black, titanium dioxide or the like, organic pigment of Phthalocyanine Blue, quinacridone red or the like, extender pigment of calcium carbonate, barium sulfate or the like, and optionally inorganic substance such as silica or the like and organic substance such as polyethylene wax or the like (these substances are usually used as delustering agent); and a hardener component:
- a resin constituent: aliphatic diisocyanate prepolymer (for example, no yellowing diisocyanate such as hexamethylene diisocyanate, isophorone diisocyanate, xylene diisocyanate or the like), aromatic diisocyanate such as T.D.I, hydrogenenated T.D.I, or so-called soft isocyanate of addition polymer of aliphatic diisocyanate and higher alcohol or polyester to introduce a soft segment into a structure for softening purpose; and
- a solvent constituent: ester solvent such as ethyl acetate, butyl acetate or the like, aromatic hydrocarbon such as toluene, xylene or the like, glycol ester such as cellosolve acetate or the like, or a mixture of them.

However, difficulties have been encountered in the above-listed single and two liquid type mold coat coating compositions, as follows: In the above single liquid type mold coat coating composition, the bond of the principal chain of the structure is an ester bond and therefore tends to be broken by hydrolysis. In the above two liquid type mold coat coating composition, the embodiment whose principal component is polyester polyol has ester bonds as the principal chain bonds and has benzene ring in the structure. The embodiment whose principal component is acryl polyol has a rigid molecular chain. Accordingly, both compositions are lower in reaction rate and therefore inferior in drying ability which is required for a coating composition for mold coat. This requires simultaneous use of reaction accelerator in order to improve drying ability, particularly to accelerate initial drying. As a result of use of the reaction accelerator, the single liquid type coating composition is inferior in moisture resistance, hot water resistance and weatherability. Similarly, the above two liquid type coating compositions respectively including, as the principal component, polyester polyol and acryl polyol have defective characteristics as shown in Table 1.

TABLE 1

| Characteristics | Conventional coating composition | |
|---|---|---|
| | Principal component: polyester polyol | Principal component: acryl polyol |
| Weatherability | Bad (chalking occurred, luster lowered) | Good |
| Bending ability after weatherability test | Poor | Poor or bad (crack produced) |
| Pot life | Poor or bad | Bad |
| Moisture resistance | Poor (whitened) | Good |
| Hot water resistance | Poor | Good |
| Open time | Shortened | Not shortened (limited) |

SUMMARY OF THE INVENTION

It is an object of the present invention to provide an improved coating composition for use in a mold coat process, overcoming difficulties encountered in conventional similar coating compositions.

Another object of the present invention is to provide an improved coating composition for use in a mold coat process, which is suitable for a molded polyurethane resin, particularly for an automotive vehicle exterior RIM (Reaction Injection Molded) polyurethane resin.

A further object of the present invention is to provide an improved coating composition in use for a mold coat process, which is excellent in physical properties such as weatherability, hot water resistance, moisture resistance and chemicals resistance, and excellent in coating characteristics such as pot life and open time (time between spraying the coating composition and closing a mold in a molding cycle), while providing excellent coated appearance of a resultant polyurethane resin product.

According to the present invention, the coating composition is used in a mold coat process wherein the coating composition is coated initially on the inner or molding surface of a mold prior to molding of polyurethane resin and then during molding the coating composition is transferred onto the surface of the molded polyurethane resin. The coating composition is comprised of a principal component including a resin constituent whose principal ingredient is an addition polymer of at least one compound selected from the group consisting of isophorone diisocyanate, hexamethylene diisocyanate and hydrogenerated methane diisocyanate, and polycarbonate polyol; and a hardener component including a resin constituent whose principal ingredient is a polymer of diisocyanate.

Hence, by virtue of the principal component of the present invention, (a) Ester or ester bond is removed or reduced, and therefore the coating composition is excellent in resistance to hydrolysis decomposition; (b) Bonding energy in the principal bond is higher; (c) Molecular weight is higher (more than 10,000), and (d) Coating film is higher in strength or excellent in balance between extension (not less than 100%) and tensile strength (200 kg/cm$^2$), thereby providing a high weatherability coating film.

By virtue of the hardener component of the present invention, a reaction system in which reaction occurs under the action of cross linking agent becomes possible after formation of the coating film upon evaporation of the solvent. This enhances two contradictary functions of prolongation of pot life and quick drying, thereby making it possible to shorten the open time. Accordingly, operational efficiency of coating or painting is improved. Additionally, by using the thinner having a good diluting ability for the principal and hardener components and having a high evaporation rate, the operational efficiency of coating or painting is further improved.

Furthermore, the coating composition according to the present invention solidifies within a short period of time and offers a predetermined strength, and therefore it does not flow under the pressure of polyurethane resin or molding material when the polyurethane resin is poured to the cavity of the mold. Besides, by suitably increasing molecular weight of the principal composition, the solvent is easily separable from the resin constituent while concordance of the coating film with the mold releasing agent is good, thus providing good appearance of the coating film.

Consequently, the coating film of the coating composition of the present invention has a high weatherability which is required for the mold coat or coating film of a molded RIM-polyurethane resin product. Therefore, the coating composition of the present invention is suitable for automotive exterior plastic parts and for a variety of paints.

Moreover, since the coating composition of the present invention has a quick drying ability though having a long pot life, the open time can be shortened. As a result, the time of a molding cycle is greatly shortened. In addition, coloring of the coating composition of the present invention can be facilitated thereby making it possible to exhibit the feeling of an integrated or one-piece member even with other parts, thereby offering a good design effect while providing lustrous molded plastic products.

DETAILED DESCRIPTION OF THE INVENTION

A coating composition according to the present invention is used in a mold coat coating process wherein the coating composition is coated initially on the inner or molding surface of a mold for polyurethane resin, prior to molding of the polyurethane resin, in which the coating composition is transferred onto the surface of the molded polyurethane resin. The coating composition is comprised of a principal component including a resin constituent whose principal ingredient is an addition polymer (referred to as "urethane polyol" hereinafter) of at least one selected from the group consisting of isophorone diisocyanate, hexamethylene diisocyanate and hydrogenated methane diisocyanate, and polycarbonate polyol; and a hardener component including a resin constituent whose principal ingredient contains polymer of aliphatic diisocyanate.

The coating composition is preferably further comprised of a thinner component for diluting the coating composition, including as a principal ingredient a mixture of ketone, aromatic hyrocarbon, ester and glycol.

It is more preferable that the composition or blending ratio of the principal component is defined as shown in Table 2, and that of the hardener component is defined as shown in Table 3.

TABLE 2

| Constituent | Content |
| --- | --- |
| "Urethane polyol" | 8 to 25 wt % |
| Methylethyl ketone | 30 to 45.5 wt % |
| Cyclohexane | 30 to 45.5 wt % |
| Pigment such as carbon | 1 to 4 wt % |
| Pigment dispersant | 0.2 to 1.5 wt % |

TABLE 3

| Constituent | Content |
| --- | --- |
| Aliphatic diisocyanate | 5 to 100 wt % |
| Ethyl acetate | 0 to 47.5 wt % |
| Toluene | 0 to 47.5 wt % |
| Reaction accelerator | 0.005 to 1.0 wt % |

EXAMPLE

To evaluate the coating composition of the present invention, Examples of the present invention will be discussed hereinafter in comparison with Comparative Examples which are not within the scope of the present invention, with reference to Tables 4 and 5 in which content is indicated in "part by weight".

EXAMPLE 1

First the principal component and the hardener component (as indicated in Table 4) were mixed and stirred in a container to be sufficiently blended. The thinner (as indicate in Table 4) for dilution purpose was added into the container and stirred to prepare the coating composition having a viscosity of 12 to 15 seconds and a non-volatile content of 9.5 to 11%. Subsequently, the prepared coating composition was sprayed onto the inner or molding surface (whose temperature was adjusted at 65° to 72° C.) of a mold by using an air spray gun having a nozzle opening diameter of 0.8 to 1.3 mm under a condition of air pressure of 2.5 to 3 kg/cm² and a discharge amount of 60 to 100 cc/min, to obtain a coating composition film having a predetermined thickness. The molding surface of the mold had been already coated with mold releasing agent before spraying the coating composition. After spraying the coating composition, the mold was immediately closed to confine therein a cavity for molding, and then polyurethane resin as the molding material was poured into the molding cavity.

Upon lapse of 30 seconds (or after completion of reaction and hardening of the molding material) after pouring of the molding material, the mold was opened to take out a molded product whose surface was coated with a mold coat (or the hardened coating composition). The mold coat was formed by being transferred from the molding surface of the mold onto the surface of the molded product.

It is to be noted that the above experiment was conducted under conditions of Examples 1 and 1' shown in Table 6.

The principal component and the hardener component used in Example 1 are shown in Table 4 and described in detail below.

The principal component
Ingredient: Addition polymer of isophorone diisocyanate and polycarbonate polyol;
Characteristics:
Molecular weight: 15,000 to 20,000
OH content: Not more than 4%
Acid value: Not less than 1
General formula: Basic frame

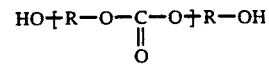

Extension/tensile strength: 450–500%/350–400 kg/cm²

Feature: Higher in resistance against hydrolysis decomposition and in bonding energy; and highly balanced in extendability and strength of coating film.

It has been confirmed that similar characteristics and feature was obtained also in case of using addition polymer of polycarbonate polyol and a mixture of at least two of isophorone diisocyanate, hexamethylene diisocyanate and hydrogenated methane diisocyanate, or in case of using addition polymer of polycarbonate polyol and one of hexamethylene diisocyanate and hydrogenated methane diisocyanate. In the characteristics and feature, the prepared principal component was higher in molecular weight and in resistance to hydrolysis decomposition depending on the fact that ester bond was removed, and higher in bond energy.

The hardener component
Ingredient: Addition polymer of hexamethylene diisocyanate and isophorone diisocyanate;
Characteristics: NCO content: 15 to 16%
Feature: No yellowing and higher drying ability It will be appreciated that addition polymer of other aliphatic diisocyanate (for example, no yellowing diisocyanate such as xylene diisocyanate) will be used as the hardener component.

EXAMPLES 2 TO 4 AND COMPARATIVE EXAMPLES 1 TO 5

Experiments of Examples 2 to 4 were conducted similarly to that of Example 1, using the principal and hardener components and the dilution thinner as shown in Tables 4 and 5 and under conditions of Examples 2 to 4 in Table 6 thereby to obtain resultant molded products with the coating films of the coating compositions. Additionally, experiments of Comparative Examples 1 to 5 were conducted similarly to that of Example 1, using the principal and hardener components and dilusion thinner as shown in Table 5 and under conditions of Comparative Examples 1 to 5 in Table 7 thereby to obtain resultant molded products with the coating films of the coating compositions.

Evaluation Test

The thus obtained coating films of the resultant molded products of Examples 1 to 4 and Comparative Examples 1 to 5 were subjected to evaluation tests as shown in Tables 6 and 7 in order to evaluate the coating compositions according to present invention.

As appreciated from the evaluation test results of Tables 6 and 7, it has been confirmed that the coating films of the coating compositions of Examples 1, 1', 2, 3 and 4 (according to the present invention) are excellent in weatherability, long in pot life and short in open time in molding cycle, as compared with those of Comparative Examples 1, 2, 3, 4 and 5 (not within the scope of the present invention).

TABLE 4

| Sample | Principal component (part by weight) | | | | | | | | | | |
|---|---|---|---|---|---|---|---|---|---|---|---|
| | Resin constituent | | Solvent constituent | | Pigment | | Reaction accelerator | Dispersant | | Light resisting agent | |
| Example 1 | Addition polymer of isophorone diisocyanate and polycarbonate polyol | 20.0 | Methylethyl-kethone Cyclohexane | 39.0 39.0 | Channel-type carbon black | 2.0 | Nil | Salt of long chain poly-aminoamide and salt of polar acid ester | 0.5 | Nil | |
| Example 2 | Addition polymer of isophorone diisocyanate and polycarbonate polyol | 20.0 | Methylethyl-kethone Cylcohexane Butyl acetate Toluene | 30.0 25.0 20.0 25.0 | Furnace-type carbon black | 2.5 | Nil | Polyamide | 0.5 | Nil | |
| Example 3 | Addition polymer of isophorone diisocyanate and polycarbonate | 20.0 | Methylethyl-kethone Cyclohexane | 39.0 39.0 | Channel-type carbon black | 2.0 | Nil aminoamide | Salt of long chain poly- and salt of polar acid ester | 0.5 oc-tylphenyl) | Benzotriazol (hydroxy-t- | 1.0 |
| Example 4 | Addition polymer of isophorone diisocyanate and polycarbonate polyol | 20.0 | Methylethyl-kethone Cyclohexane Butyl acetate | 32.0 46.0 | Channel-type carbon black | 2.5 | Nil | Salt of poly-carboxylic acid (Trade name: AT203) | 1.0 | Hydroxy-t-octylphenyl benzotri-azole Tris-butyl-hydroxy-dimethyl-isocyanuric acid | 1.0 0.5 |

| Sample | Hardener component (part by weight) | | | | | | Dillution thinner (part by weight) | |
|---|---|---|---|---|---|---|---|---|
| | Resin constituent | | Solvent constituent | | Reaction accelerator | | | |
| Example 1 | Addition polymer of hexamethylene diisocyanate and iso-phorone diisocyanate | 18.0 | Ethyl acetate Toluene | 38.0 44.0 | Dibutyltine dilaurate | 0.05 | Methylethyl-kethone Cyclohexane Toluene Xylene Butyl acetate | 24.5 24.5 7.0 28.0 18.0 14.0 |
| Example 2 | Addition polymer of hexamethylene diisocyanate and iso-phorone diisocyanate | 18.0 | Ethyl acetate Toluene | 38.0 44.0 | Dibutyltine dilaurate | 0.05 | Ethyl acetate Cellosolve acetate <or> Methylethyl kethone | 2.0 6.0 35.0 |
| Example 3 | Addition polymer of hexamethylene and iso-phorone diisocyanate | 18.0 | Ethyl acetate Toluene | 38.0 44.0 | Dibutyltine dilaurate | 0.05 | Cyclohexane Toluene Butyl acetate | 10.0 35.0 20.0 |
| Example 4 | Isocyanurate type of hexamethylene diisocyanate (Trade name: Cholonate EH) | 15.0 | Ethyl acetate | 85.0 | Nil | | | |

TABLE 5

| Sample | Principal component (part by weight) | | | | | | Hardener component | | | |
|---|---|---|---|---|---|---|---|---|---|---|
| | Resin constituent | Solvent constituent | Pigment | Reaction accelerator | Dispersant | Light resisting agent | Resin constituent | Solvent Constituent | Dilution thinner (part by weight) | |
| Comparative example 1 | Acryl polyol as copolymer of hydroxyethylmethacrylate, methylmethacrylate and butylacrylate 24.0 | Toluene 23.0<br>Xylene 20.0<br>Butyl acetate 14.0<br>Cellosolve acetate 9.3 | Silica powder 8.0<br>Carbon black (channel type) 1.7 | Dibutyltin octate 0.03 | Salt of long chain polyaminoamide and polar acid ester 0.5 | Benzotriazole 0.5<br>1,3,5-tris-isocyanuric acid 0.15 | Prepolymer of hexamethylene diisocyanate and polyester polyol 81.0 | Toluene 9.0<br>Ethyl acetate 10.0 | Ethyl acetate<br>Cellosolve acetate<br>Toluene<br>Xylene<br>Methylisobutylkethone | 14.0<br>10.0<br>42.0<br>24.0<br>10.0 |
| Comparative example 2 | Mixture of polyester polyol and copolymer of vinyl chloride and vinyl acetate 22.0 | Toluene 20.0<br>Xylene 21.0<br>Ethyl acetate 15.0<br>Methyl-isobutylketon 6.0<br>Cellosolve acetate 8.5 | Silica powder 4.0<br>Polyethylene wax 2.5<br>Carbon black (channel type) 2.0 | Dibutyltin octate 0.02 | Salt of polycarboxylic acid 0.5 | Benzotriazole 1.0 | Xylene diisocyanate 25.0 | Ethyl acetate 75.0 | Ethyl acetate<br>Toluene<br>Methylisobutylkethone<br>Butyl acetate | 25.0<br>30.0<br>25.0<br>20.0 |
| Comparative example 3 | Mixture of polyester polyol and hydroxyacrylate containing stylen 23.0 | Toluene 20.0<br>Xylene 21.0<br>Ethyl acetate 15.0<br>Methyl-isobutylketon 6.0<br>Cellosolve acetate 4.5 | Silica powder 5.0<br>Polyethylene wax 3.0<br>Carbon black (channel type) 2.5 | Dibutyltin octate 0.02 | Salt of polycarboxylic acid 0.5 | Benzotriazole 0.5 | Xylene diisocyanate 25.0 | Ethyl acetate 75.0 | | |
| Comparative example 4 | Mixture of polyester polyol and hydroxyacrylate containing stylen 23.0 | Toluene 20.0<br>Xylene 21.0<br>Ethyl acetate 15.0<br>Methyl-isobutylketon 6.0<br>Cellosolve acetate 4.5 | Silica powder 5.0<br>Polyethylene wax 3.0<br>Carbon black (channel type) 2.5 | Dibutyltin octate 0.02 | Salt of polycarboxylic acid 0.5 | Benzotriazole 0.5 | Toluene diisocyanate 25.0 | Ethyl acetate 75.0 | | |
| Comparative example 5 | Polyurethane compound as addition polymer of glycols and diisocyanate (no yellowing type) 20.0 | Methylethylkethone 25.0<br>Cyclohexane 20.0<br>Isopropyl alcohol 8.0<br>Diacetone alcohol 5.5<br>Methyl-iso-butylketone 15.0 | Silica powder 2.5<br>Polyethylene wax 2.0<br>Carbon black (channel type) 2.0 | Nil | Salt of long chain polyaminoamide and polar acid ester 0.5 | Benzotriazole 0.5 | Addition polymer of hexamethylene diisocyanate and isophorone diisocyanate 20.0 | Toluene 25.0<br>Ethyl acetate 45.0 | Toluene<br>Methylethylkethone<br>Diacetone alcohol<br>Cyclohexanone<br>Methylisobutyl ketone | 25.0<br>35.0<br>10.0<br>10.0<br>20.0 |

TABLE 6

| Item | | Example 1 | Example 2 | Example 3 | Example 4 | Example 5 |
|---|---|---|---|---|---|---|
| Blending ratio (part by weight) | Principal component | 100 | 100 | 100 | 100 | 100 |
| | Hardener component | 10 | 10 | 10 | 10 | 10 |
| | Thinner | 130 | 130 | 130 | 130 | 130 |
| NV during coating | | 9.7% | 9.7% | 9.7% | 10.7% | 9.7% |
| Thickness of dried coating film | | 10 to 20μ | 10 to 20μ | 10 to 20μ | 10 to 20μ | 20 to 30μ |
| Molding condition of polyurethane resin product to be coated with coating composition | Metal mold temperature | 70 to 72° C. | 70 to 72° C. | 70 to 72° C. | 70 to 72° C. | 70 to 72° C. |
| | Curing time | 30 to 40 sec. | 30 to 40 sec. | 30 to 40 sec. | 30 to 40 sec. | 30 to 40 sec. |
| | Mold releasing agent | Silicone wax | Silicone wax | Silicone wax | Silicone wax | Silicone wax |
| | Open time | 5 to 30 sec. | 5 to 30 sec. | 5 to 30 sec. | 5 to 30 sec. | 10 to 30 sec. |
| Evaluation test result of coating film of coating composition | Appearance | Excellent | Excellent | Excellent | Excellent | Excellent |
| | Adherence to molded polyethylene resin | Excellent | Excellent | Excellent | Excellent | Excellent |
| | Moisture resistance | Good to excellent | Good to excellent | Good to excellent | Good to excellent | Good to excellent |
| | Hot water resistance | Good to excellent | Good to excellent | Good to excellent | Good to excellent | Good to excellent |
| | Chemicals resistance | Excellent | Excellent | Excellent | Excellent | Excellent |
| | Heat resistance | Excellent | Excellent | Excellent | Excellent | Excellent |
| | Weatherability S-W · O-M 2000 hrs. | ΔE 1.6 GR 19.8% (No chalking) Bendability: Good | ΔE 1.5 GR 18.5% (No chalking) Bendability: Good | ΔE 1.45 GR 20.0% (No chalking) Bendability: Good | ΔE 1.56 GR 19.5% (No chalking) Bendability: Good | ΔE 1.5 GR 19.0% (No chalking) Bendability: Good |
| | QUV 2000 hrs. | ΔE 9.5 GR 50.5% (No chalking) Bendability: Good | ΔE 5.1 GR 51.0% (No chalking) Bendability: Good | ΔE 6.4 GR 52.5% (No chalking) Bendability: Good | ΔE 8.3 GR 49.5% (No chalking) Bendability: Good | ΔE 7.6 GR 51.0% (No chalking) Bendability: Good |
| | Pot life | 8 to 10 hrs. | 8 to 10 hrs. | 8 to 10 hrs. | 8 to 10 hrs. | 8 to 10 hrs. |

TABLE 7

| Item | | Comparative example 1 | Comparative example 2 | Comparative example 3 | Comparative example 4 | Comparative example 5 |
|---|---|---|---|---|---|---|
| Blending ratio (part by weight) | Principal component | 100 | 100 | 100 | 100 | 100 |
| | Hardener component | 15 | 16 | 16 | 15 | 10 |
| | Thinner | 70 | 30 | 40 | 30 | 100 |
| NV during coating | | 24.0% | 23.0% | 24.0% | 24.0% | 13.5% |
| Thickness of dried coating film | | 15 to 20μ | 15 to 20μ | 15 to 20μ | 15 to 20μ | 10 to 20μ |
| Molding condition of polyurethane resin product to be coated with coating composition | Metal mold temperature | 70 to 72° C. | 70 to 72° C. | 70 to 72° C. | 70 to 72° C. | 70 to 72° C. |
| | Curing time | 30 to 40 sec. | 30 to 40 sec. | 30 to 40 sec. | 30 to 40 sec. | 30 to 40 sec. |
| | Mold releasing agent | Silicone wax | Silicone wax | Silicone wax | Silicone wax | Silicone wax |
| | Open time | 30 sec. to 2 min. | 30 sec. to 2 min. | 30 sec. to 2 min. | 30 sec. to 2 min. | 30 sec. to 2 min. |
| Evaluation test result of coating composition | Appearance | Permissible to good | Good | Good | Good | Good |
| | Adherence to molded polyethylene resin | Excellent | Excellent | Excellent | Excellent | Excellent |
| | Moisture resistance | Excellent | Permissible to good | Good to excellent | Permissible to good | Bad to Permissible |
| | Hot water resistance | Excellent | Permissible to good | Good to exceleint | Permissible to good | Bad to Permissible |
| | Chemicals resistance | Excellent | Permissible to good | Excellent | Permissible to good | Good |

TABLE 7-continued

| Item | Comparative example 1 | Comparative example 2 | Comparative example 3 | Comparative example 4 | Comparative example 5 |
|---|---|---|---|---|---|
| Heat resistance | Excellent | Good | Good | Permissible | Good |
| Weatherability | Bad | Bad | Bad | Bad | Bad |
| S-W · O-M 2000 hrs. | ΔE 4.5 GR 15.5% Crack occurred upon bending | ΔE 6.5 GR 5.0% (Chalking occurred) Crack occurred upon bending | ΔE 6.0 GR 10.5% (Chalking occurred) Crack occurred upon bending | ΔE 12.5 GR 3.0% (Chalking occurred) Crack occurred upon bending | ΔE 8.6 GR 5.4% (Chalking occurred) Crack occurred upon bending |
| QUV 2000 hrs. | ΔE 4.8 GR 16.5% Crack occured upon bending | ΔE 7.2 GR 4.5% Crack occurred upon bending | ΔE 8.5 GR 8.0% Crack occurred upon bending | ΔE 11.6 GR 2.0% (Chalking occurred) Crack occurred upon bending | ΔE 9.4 GR 3.0% (Chalking occurred) Crack occurred upon bending |
| Pot life | 3 to 4 hrs. | 5 to 6 hrs. | 5 to 6 hrs. | 4 to 5 hrs. | 2 to 9 hrs. |

What is claimed is:

1. A coating composition for use in a mold coat coating process, wherein said coating process includes the steps of initially coating said coating composition the inner surface of a mold prior to molding of a polyurethane resin and subsequently transferring during molding said coating composition onto the surface of the molded polyurethane resin, said coating composition comprising:
    (a) a principal component comprising a resin constituent that comprises units of (i) at least one selected from the group consisting of isophorone diisocyanate, hexamethylene diisocyanate and hydrogenated methane diisocyanate, and (ii) a polycarbonate polyol; and
    (b) a hardener component comprising an addition polymer including an aliphatic diisocyanate.

2. A coating composition as claimed in claim 1, further comprising a thinner composition for diluting said coating composition, said thinner composition comprising a mixture of at least one ketone, at least one aromatic hydrocarbon and at least one ester.

3. A coating composition as claimed in claim 1, wherein said resin constituent is present in said principal component in an amount ranging from 8 to 25% by weight of said principal component.

4. A coating composition as claimed in claim 1, wherein said principal component further comprises a solvent constituent comprising at least one of methyl ethyl ketone and cyclohexanone.

5. A coating composition as claimed in claim 4, wherein each of methyl ethyl ketone and cyclohexanone is present in an amount ranging from 30 to 45.5% by weight of said principal component.

6. A coating composition as claimed in claim 1, wherein said principal component further comprises a pigment in an amount ranging from 1 to 4% by weight of said principal component.

7. A coating composition as claimed in claim 6, wherein said pigment is carbon black.

8. A coating composition as claimed in claim 6, wherein said principal component further comprises a dispersant for said pigment, in an amount ranging from 0.2 to 1.5% by weight of said principal component.

9. A coating composition as claimed in claim 1, wherein said aliphatic diisocyanate is present in an amount ranging from 5 to 100% by weight of said hardener component.

10. A coating composition as claimed in claim 1, wherein said hardener component further comprises a solvent constituent comprising at least one of ethyl acetate and toluene.

11. A coating composition as claimed in claim 10, wherein each of said ethyl acetate and toluene is present in an amount not exceeding 47.5% by weight of said hardener component.

12. A coating composition as claimed in claim 1, wherein said hardener component further comprises a reaction accelerator in an amount ranging from 0.005 to 1.0% by weight of said hardener component.

13. A coating composition as claimed in claim 12, wherein asid reaction accelerator is dibutyltin dilaurate.

14. A coating composition as claimed in claim 2, wherein said thinner composition comprises a mixture of methyl ethyl, cyclohexanone, toluene and butyl acetate.

15. A coating composition as claimed in claim 1, wherein said hardener component comprises an addition polymer of hexamethylene diisocyanate and isophorone diisocyanate.

* * * * *